Aug. 1, 1939.  M. L. TAYLOR  2,168,008
APPARATUS FOR PREVENTING ICE ACCUMULATION
Filed Aug. 20, 1937
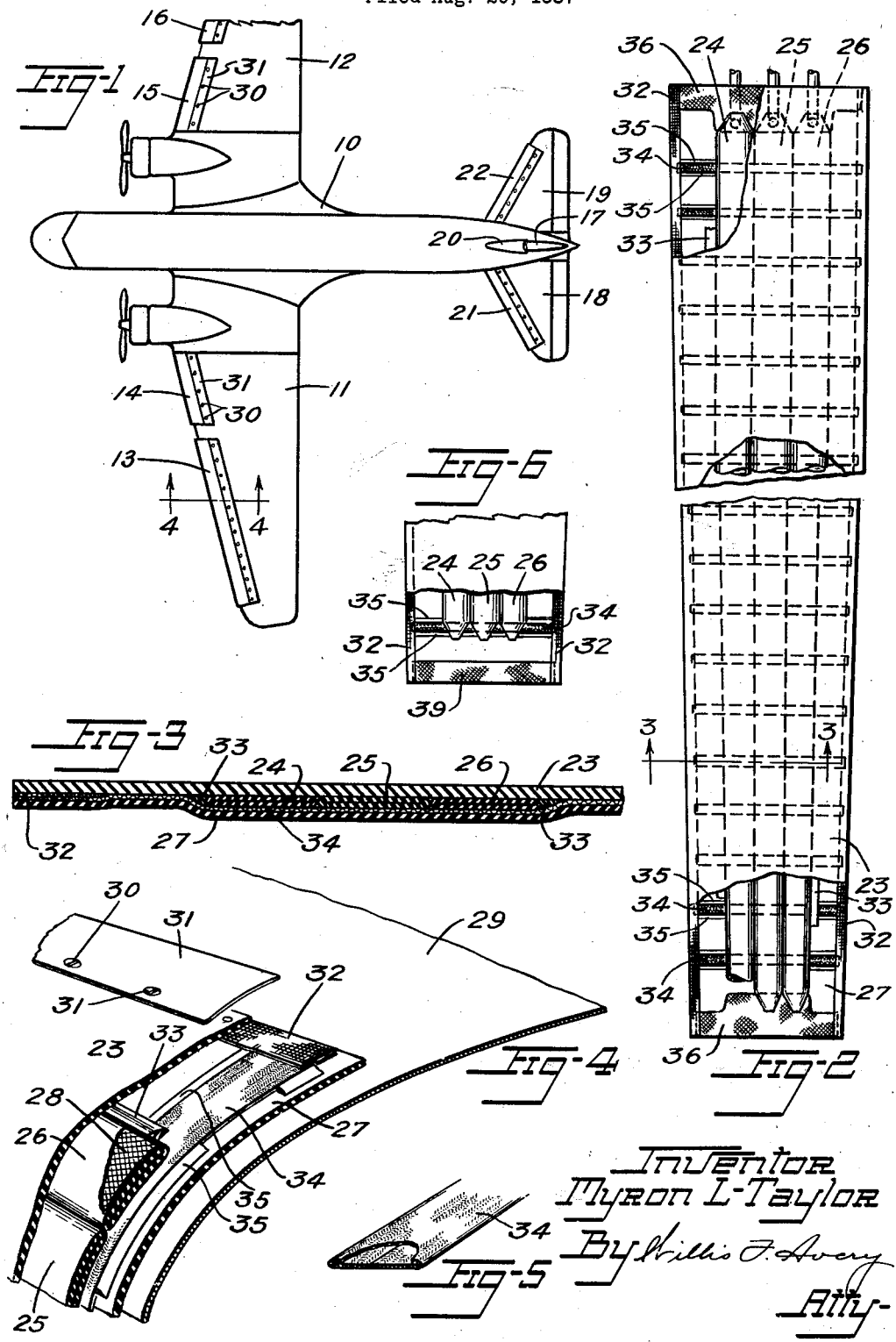

Patented Aug. 1, 1939

2,168,008

UNITED STATES PATENT OFFICE 2,168,008

APPARATUS FOR PREVENTING ICE ACCUMULATION

Myron L. Taylor, Hudson, Ohio, assignor to The B. F. Goodrich Company, New York, N. Y., a corporation of New York Application August 20, 1937, Serial No. 160,105

5 Claims. (Cl. 244—134)

This invention relates to apparatus for preventing ice accumulation upon surfaces and is especially useful in the dislodging of ice from the surfaces of travelling aircraft and other vehicles.

The invention relates especially to an improved construction of shoes or coverings for the wings, struts, fins and stabilizers of aircraft comprising inflatable tubes adapted to be intermittently inflated and deflated, singly or in groups, so as to change the contour of the surface and thereby break the accumulated ice for removal in a manner for example as is disclosed in the patent to Geer No. 1,998,809.

As the shoe for this purpose is usually mounted in a condition of tension and is subjected to stretching forces in operation, any rupture, even though it be originally small, is likely to enlarge or spread undesirably, and the invention provides, among other things, for effectively resisting the tearing of the extensible parts.

The principal objects of the invention are to provide improved strength and security while permitting extensibility, to provide localization of injuries and to provide improved anchorage of the parts. These and other objects will be apparent from the following description, reference being had to the accompanying drawing.

Of the drawing:

Fig. 1 is a plan view of an airplane illustrating the application of the ice-dislodging equipment thereto, the view being merely an example of application of the invention to one type of aircraft, one of the wing tips being broken away.

Fig. 2 is a plan view of one of the ice-dislodging shoes before it is applied to the plane, the shoe being constructed according to and embodying the invention in its preferred form, parts being broken away.

Fig. 3 is a section taken along the line 3—3 of Fig. 2.

Fig. 4 is a perspective view of a portion of the wing surface with the shoe of the invention applied thereto, the parts being broken away in steps to illustrate its construction, parts being shown in section.

Fig. 5 is a detail perspective view of one of the elastic textile tapes in its preferred form, parts being broken way and sectioned.

Fig. 6 is a fragmentary plan view of an end of a modified form of shoe, parts being broken away.

Referring to the drawing, Fig. 1 shows an airplane 10 having wings 11, 12 each equipped on its leading edge with ice dislodging shoes 13, 14, 15, 16. The fin 17 and stabilizers 18, 19 may also be equipped with similar ice dislodging shoes 20, 21 and 22. Each of the shoes comprises an elastic cover 23 attached over the leading edge of its airfoil or other structure and having a plurality of inflatable elastic tubes 24, 25, 26 disposed in a direction to extend along the edge, the tube being adapted to be inflated intermittently so as to break up ice which may form on the shoe. The tubes 24, 25, 26 may be made of any elastic impervious material such as rubber, but in order to assure uniform inflation thereof from end to end and to prevent ballooning at localized areas it is preferred to construct them of rubberized elastic fabric 28 such as stockinette coated on each face with rubber, or of other elastic knitted or woven material such as bias-laid open-mesh fabric. The inflation tubes, which are normally flat and uninflated, are secured between covering layers 23 and 27 of smooth elastic material such as sheet rubber or other rubber-like material. To provide for attaching these layers to the wing 29 or other surface, a series of screws 30, 30 are threaded to engage the wing or hollow threaded tubular rivets affixed to the skin or underlying structure and pass first through a fairing strip 31 of sheet metal of slightly curved cross-section and then through the margins of the shoe, thereby clamping the shoe to the wing in streamlined fashion.

The margins of the rubber layers may be reinforced by strips 32, 32 of reinforcing material, preferably stiff, which may be of square woven straight-laid fabric preferably vulcanized thereto between the layers.

Triangular rubber filler strips 33, 33 preferably are applied along the tubes 24, 26 at their margins where the layers 23 and 27 meet. This provides against any abrupt bending of the outer cover of the tube edges.

To provide against excessive tearing of the shoe, especially in the tensioned layers 23 and 27 as a result of any accidental break in these layers, reinforcing tapes 34, 34 of extensible material preferably elastic are provided at spaced intervals between the inflatable tubes and one of the rubber layers, preferably the lower layer 27, so as to extend transversely of the tubes and the rubber layers between which they are secured. For security of anchorage, the tapes 34, 34 are so laid that their ends extend at least partially across the reinforcing strips 32, 32 of fabric at the margins of the rubber layers. The tapes 34, 34 are preferably made of a highly elastic or stretchable fabric, such as knit or crocheted material having strong threads so as to provide high stretchability of the tape in the direction of its length, that is, in the direction transverse of the shoe or generally chordwise of the airfoil. To resist tearing of the edges more effectively, the tapes have their margins folded as shown in Fig. 5 to provide a doubled structure. A fabric known as Tricot fabric has been found suitable for the purpose. The strips are preferably provided with sufficient stretchability by calendering the fabric with a rubber coating while it is held stretched longitudinally, then cutting the strips for the tapes transversely of the direction of stretch to provide maximum stretchability in the longitudinal direction of the tape. Filler strips 35 of rubber are preferably applied along the margins of the tapes to avoid offsets in the surface layers.

For end reinforcement a patch 36 of extensible fabric may be applied between the layers 23 and 27 at the ends of the device with the ends of the air tubes preferably overlapping the patch and secured thereto. This patch also may be of the Tricot fabric and is generally of T-shape with the tube ends secured to its stem and its cross-member secured between the plies of rubber, and the patch is stretchable in the transverse direction of the shoe, like the tapes 34, 34. This provides an elastic anchorage for the ends of the tube without objectionably restricting their inflating action. This construction provides for effectively resisting tear progression in the rubber layers 23, 27 around the tube ends.

In the embodiment shown in Fig. 6 a modified form of tube anchorage is employed. Here a strip 39 of extensible fabric is laid between and secured to the layers of rubber beyond the ends of the tubes, at the end of the shoe. Thus, the ends of the tubes are relatively free from reinforcement except that a tape 34 is provided at the tube ends. Somewhat less stiffness is afforded by this construction especially in providing a freer action of the tube ends, and tear resistance is adequately provided for.

In manufacturing the shoe, the layer 23 of rubber composition is first laid face downward on a smooth sheet of tin or other backing. The rubberized fabric air tubes 24, 25 and 26, are cemented thereto. The filler strips 33 are then cemented in place. The marginal strips 32 of fabric are then cemented along each margin of the layer 27 and the end patches 36 secured in place. The tapes 34, 34 and filler strips 35, 35 are then cemented over the air tubes 24, 25, 26, filler strips 33 and reinforcing strips 32 in spaced relation. The layer 27 of rubber is then cemented to the other parts and the complete shoe is then vulcanized. Air connections 24a, 25a, 26a are provided to connect the tubes 24, 25, 26 to a suitable means for inflating and deflating the tubes.

The completed shoe is stretched chordwise over the leading edge of the wing or other member to be protected and is fastened in place as by the fairing strips and screws along each of its margins.

The elasticity of the tapes 34 permits not only the stretch of the shoe incident to its mounting, but also permits the necessary flexing of the layers 23 and 27 during the inflation of the tubes, and these tapes provide effective tear resistance despite their extensibility.

When cutting or puncturing of the layers 23 or 27 occurs, such as cutting or puncturing caused for example by static discharge, or by physical impact on the shoe, undesirable enlargement of the cut or puncture by tearing is restricted to the space between two of the adjacent strips 34, 34, these strips resisting further travel of the tear, so that the aerodynamic characteristics of the wing or other airfoil are not objectionably affected, and so that repair is simplified.

The folded margins of the tapes prevent tearing of the tapes by presenting margins free from raw edges, and the anchorage of the tapes at their ends at the fabric strips 32 and their adhesion to the rubber layers 23, 27 effectively prevent the tapes from being torn loose.

Variations may be made without departing from the invention as it is defined in the following claims.

I claim:

1. Apparatus for preventing ice accumulation, said apparatus comprising an area of highly stretchable sheet rubber-like material, means for stretching the same to loosen ice deposited thereon, and stretchable reinforcing strips disposed in spaced-apart relation across said area, said strips being less stretchable than said rubber-like material and highly resistant to tearing and so associated with said material that accidental tearing of said material is limited to the regions between said strips and adequate stretchability of said area is provided for effectively preventing ice accumulation.

2. Apparatus for preventing ice accumulation, said apparatus comprising an area of highly stretchable sheet rubber-like material, means for stretching the same to loosen ice deposited thereon, and stretchable textile reinforcing strips disposed in spaced-apart relation across said area and adhered to said material, said strips being less stretchable than said rubber-like material and highly resistant to tearing so that accidental tearing of said material is limited to the regions between said strips and adequate stretchability of said area is provided for effectively preventing ice accumulation.

3. Apparatus for preventing ice accumulation, said apparatus comprising an area of highly stretchable sheet rubber-like material, means for stretching the same to loosen ice deposited thereon, and stretchable textile reinforcing tapes having folded margins adhered to said material in spaced-apart relation across said area, said strips being less stretchable than said rubber-like material and highly resistant to tearing so that accidental tearing of said material is limited to the regions between said tapes and adequate stretchability of said area is provided for effectively preventing ice accumulation.

4. Apparatus for preventing ice accumulation, said apparatus comprising an area of stretchable sheet rubber-like material, inflatable tubes extending along the same, means for inflating the tubes to stretch said material to loosen ice deposited thereon, and stretchable tapes mounted in spaced-apart relation across the tubes and adhered to said material, said tapes being less stretchable than said rubber-like material and highly resistant to tearing so that accidental tearing of said material is limited to the regions between said tapes and adequate stretchability of said area is provided for effectively preventing ice accumulation.

5. Apparatus for preventing accumulation of ice upon the leading edge of an airfoil, said apparatus comprising an elastic shoe adapted to be mounted under tension chordwise of the airfoil upon said edge, the shoe comprising a pair of elastic sheets comprising rubber-like material and intermediate inflating means, and a plurality of stretchable textile tapes disposed in spaced-apart relation and extending chordwise between the sheets in adhered relation thereto, said tapes being less stretchable than said rubber-like material and highly resistant to tearing so that accidental tearing of the shoe is limited to the regions between the tapes and adequate stretchability of the shoe is provided for effectively preventing ice accumulation.

MYRON L. TAYLOR.